United States Patent
Harada et al.

(10) Patent No.: US 11,938,970 B2
(45) Date of Patent: Mar. 26, 2024

(54) CONTROL DEVICE, INFORMATION PROCESSING DEVICE, AND INFORMATION PROCESSING METHOD FOR INSTRUCTING MOVEMENT OF A VEHICLE DETACHABLY CONNECTED TO OR LOADED ON ANOTHER VEHICLE

(71) Applicant: TOYOTA JIDOSHA KABUSHIKI KAISHA, Toyota (JP)

(72) Inventors: Takahiro Harada, Chiryu (JP); Teppei Nishiguchi, Nisshin (JP); Kazuki Komoriya, Toyota (JP); Tomoaki Ihara, Toyota (JP); Miyu Higashimura, Toyota (JP); Toshihiro Nakaichi, Nagoya (JP); Kazunobu Okasaka, Toyota (JP); Ryo Hattori, Kariya (JP); Yohei Tanigawa, Toyota (JP); Ryohei Kimbara, Toyota (JP); Hiroshi Nakamura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 17/185,475

(22) Filed: Feb. 25, 2021

(65) Prior Publication Data
US 2021/0331705 A1 Oct. 28, 2021

(30) Foreign Application Priority Data
Apr. 27, 2020 (JP) .................................. 2020-078015

(51) Int. Cl.
*B60W 30/10* (2006.01)
*B60W 30/14* (2006.01)
(Continued)

(52) U.S. Cl.
CPC ........ *B60W 60/0025* (2020.02); *B60W 30/16* (2013.01); *B60W 2554/80* (2020.02); *B60W 2556/65* (2020.02)

(58) Field of Classification Search
CPC ......... B60W 60/0025; B60W 2556/65; B60W 2554/80; B60W 30/16
See application file for complete search history.

(56) References Cited

U.S. PATENT DOCUMENTS 9,940,840 B1 * 4/2018 Schubert ............ G01C 21/3407
2010/0082179 A1 4/2010 Kronenberg
(Continued)

FOREIGN PATENT DOCUMENTS

| CN | 108459601 A | 8/2018 |
| JP | H08-192662 A | 7/1996 |

*Primary Examiner* — Jess Whittington
*Assistant Examiner* — Rami Nabih Bedewi
(74) *Attorney, Agent, or Firm* — Oliff PLC

(57) ABSTRACT

A control device that is mounted in a second vehicle which a first vehicle having a following travel function is detachably connected to or loaded on is provided. The control device includes a control unit configured to perform: detecting another vehicle that is within a predetermined range from the second vehicle in a state in which the second vehicle has the first vehicle connected thereto or loaded thereon and of which some or all of a scheduled travel route is the same as some or all of a scheduled travel route of the first vehicle after the first vehicle has been disconnected from the second vehicle; and transmitting following instruction information to the first vehicle and disconnecting the first vehicle from the second vehicle such that the first vehicle travels with the detected other vehicle as a preceding vehicle by the following travel function.

20 Claims, 11 Drawing Sheets

(51) Int. Cl.
  *B60W 30/16* (2020.01)
  *B60W 40/04* (2006.01)
  *B60W 60/00* (2020.01)
  *G08G 1/00* (2006.01)
  *G08G 1/09* (2006.01)

(56) References Cited

U.S. PATENT DOCUMENTS

| | | | |
|---|---|---|---|
| 2017/0355295 A1* | 12/2017 | Gutowitz | B60K 1/00 |
| 2018/0237012 A1* | 8/2018 | Jammoussi | H04W 4/46 |
| 2018/0290561 A1* | 10/2018 | Baumgärtner | H02J 7/0013 |
| 2019/0025821 A1* | 1/2019 | Salomon | G05D 1/0027 |
| 2019/0171227 A1* | 6/2019 | Sujan | G05D 1/0295 |
| 2019/0210479 A1* | 7/2019 | Bachmann | B60L 53/665 |
| 2019/0339716 A1* | 11/2019 | Kopischke | B60W 50/14 |
| 2020/0175880 A1* | 6/2020 | Ibrahim | G08G 1/0129 |
| 2021/0089053 A1* | 3/2021 | Georgeson | B60D 1/481 |
| 2021/0148716 A1* | 5/2021 | Atanasiu | G01C 21/3438 |

\* cited by examiner

CONTROL DEVICE, INFORMATION PROCESSING DEVICE, AND INFORMATION PROCESSING METHOD FOR INSTRUCTING MOVEMENT OF A VEHICLE DETACHABLY CONNECTED TO OR LOADED ON ANOTHER VEHICLE

CROSS-REFERENCE TO RELATED APPLICATION

This application claims priority to Japanese Patent Application No. 2020-078015 filed on Apr. 27, 2020, incorporated herein by reference in its entirety.

BACKGROUND

1. Technical Field

The present disclosure relates to a control device, an information processing device, and an information processing method.

2. Description of Related Art

A travel control device for a vehicle is disclosed in Japanese Unexamined Patent Application Publication No. 08-192662 (JP 08-192662 A). The travel control device described in JP 08-192662 A includes a following travel control means that measures an inter-vehicle distance from a preceding vehicle using an inter-vehicle distance measuring means and controls a vehicle speed such that the measured inter-vehicle distance reaches a predetermined distance and a constant-speed travel control means that causes the vehicle to travel at a preset vehicle speed when no preceding vehicle is detected. The travel control device further includes an operation switch that outputs a start instruction signal for following travel control and constant-speed travel control, a first vehicle speed setting means that sets the vehicle speed at the time of constant-speed travel to a vehicle speed when the start instruction signal is output, and a second vehicle speed setting means that sets the vehicle speed at the time of following travel to a predetermined value which is greater than the vehicle speed when the start instruction signal is output.

SUMMARY

The disclosure provides a technique of enabling a vehicle to move efficiently.

A control device according to a first aspect of the disclosure is a control device that is mounted in a second vehicle which a first vehicle having a following travel function is detachably connected to or loaded on, the control device including a control unit configured to perform: detecting another vehicle that is within a predetermined range from the second vehicle in a state in which the second vehicle has the first vehicle connected thereto or loaded thereon and of which some or all of a scheduled travel route is the same as some or all of a scheduled travel route of the first vehicle after the first vehicle has been disconnected from the second vehicle; and transmitting following instruction information to the first vehicle and disconnecting the first vehicle from the second vehicle such that the first vehicle travels with the detected other vehicle as a preceding vehicle by the following travel function.

An information processing device according to a second aspect of the disclosure is an information processing device that manages a second vehicle which a first vehicle having a following travel function is detachably connected to or loaded on, the information processing device including a control unit configured to perform: detecting another vehicle that is within a predetermined range from the second vehicle in a state in which the second vehicle has the first vehicle connected thereto or loaded thereon and of which some or all of a scheduled travel route is the same as some or all of a scheduled travel route of the first vehicle after the first vehicle has been disconnected from the second vehicle; and transmitting instruction information to the second vehicle such that the first vehicle travels with the detected other vehicle as a preceding vehicle by the following travel function.

An information processing method according to a third aspect of the disclosure is an information processing method which is performed by a computer of a system including a control device that controls a second vehicle which a first vehicle having a following travel function is detachably connected to or loaded on, the information processing method including: detecting another vehicle that is within a predetermined range from the second vehicle in a state in which the second vehicle has the first vehicle connected thereto or loaded thereon and of which some or all of a scheduled travel route is the same as some or all of a scheduled travel route of the first vehicle after the first vehicle has been disconnected from the second vehicle; and transmitting following instruction information from the control device to the first vehicle and causing the control device to disconnect the first vehicle from the second vehicle such that the first vehicle travels with the detected other vehicle as a preceding vehicle by the following travel function.

According to the disclosure, it is possible to enable a vehicle to move efficiently.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
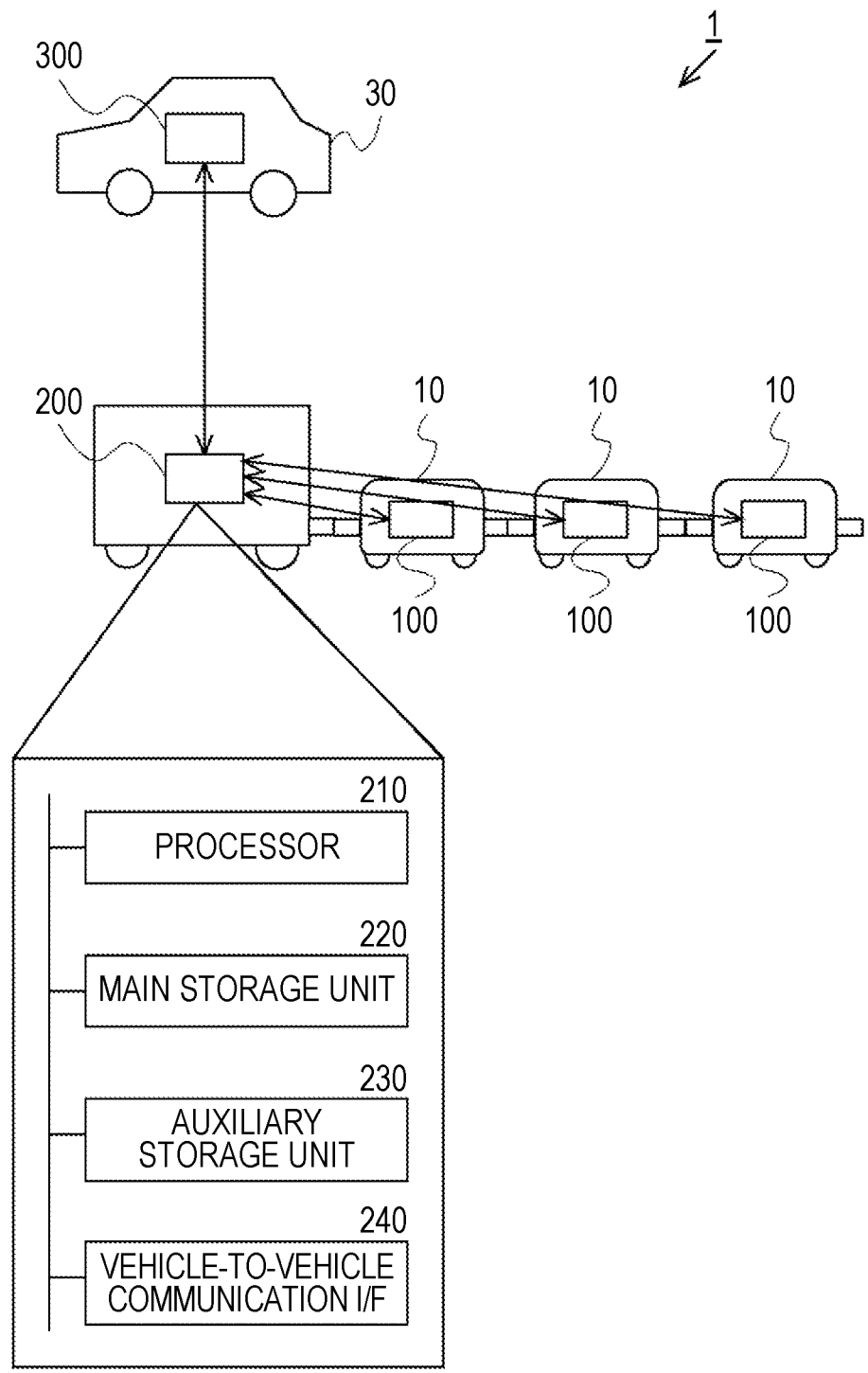
FIG. 1 is a diagram schematically illustrating a configuration of a control system according to a first embodiment.

A control device according to a first aspect of the present disclosure is a control device that is mounted in a second vehicle. Here, the second vehicle is a vehicle which a first vehicle having a following travel function is detachably connected to or loaded on. The second vehicle travels in a state in which the first vehicle is connected thereto or loaded thereon. Accordingly, the first vehicle can move in a state in which it is connected to or loaded on the second vehicle to the middle of a route to its own destination. The first vehicle automatically follows a preceding vehicle by the following travel function after the first vehicle has been disconnected from the second vehicle.

In the control device according to the first aspect of the disclosure, a control unit detects another vehicle which is near the second vehicle in a state in which the first vehicle is connected to or loaded on the second vehicle. At this time, the control unit detects another vehicle that is within a predetermined range from the second vehicle and of which some or all of a scheduled travel route is the same as some or all of a scheduled travel route of the first vehicle after the first vehicle has been disconnected from the second vehicle. Then, the control unit transmits following instruction information to the second vehicle such that the first vehicle travels with the detected other vehicle as a preceding vehicle by the following travel function. At this time, the control unit disconnects the first vehicle from the second vehicle such that the first vehicle travels with the detected other vehicle as a preceding vehicle by the following travel function. Accordingly, the first vehicle can automatically follow the other vehicle of which some or all of the scheduled travel route is the same after the first vehicle has been disconnected from the second vehicle.

As described above, the first vehicle moves to the middle of a route to its own destination in a state in which the first vehicle is connected to or loaded on the second vehicle. When another vehicle that can serve as a preceding vehicle within a predetermined range from the second vehicle (that is, another vehicle of which some or all of a scheduled travel route is the same) is detected, the first vehicle is disconnected from the second vehicle. Then, the first vehicle automatically follows the detected other vehicle. In this way, the first vehicle can move to the middle of the route to its own destination in a state in which the first vehicle is connected to or loaded on the second vehicle, and can move to its destination by automatically following a vehicle other than the second vehicle from the middle of the route. As a result, the first vehicle can move efficiently.

Specific embodiments of the disclosure will be described below with reference to the accompanying drawings. Sizes, materials, shapes, and relative arrangements of constituent elements described in the embodiments are not intended to limit the technical scope of the disclosure thereto unless otherwise described.

First Embodiment

Configuration of System

A control system 1 according to this embodiment will be described below with reference to FIG. 1. FIG. 1 is a diagram schematically illustrating a configuration of the control system 1 according to this embodiment. The control system 1 includes travel control devices 100 that are mounted in a plurality of first vehicles 10, a control device 200 that is mounted in a second vehicle 20, and an onboard device 300 that is mounted in another vehicle 30.

Figure 2:
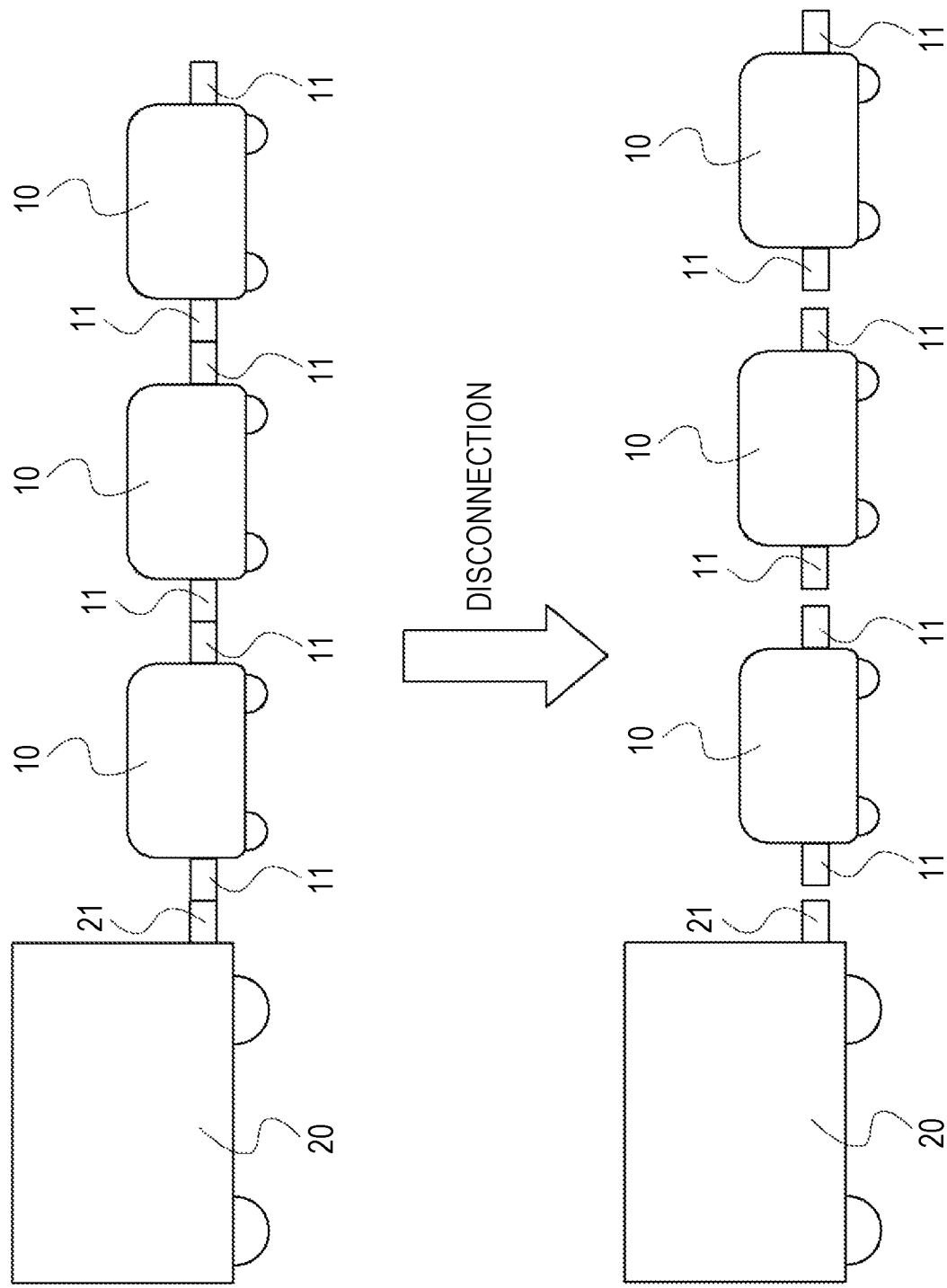
FIG. 2 is diagram illustrating an example of a state in which a plurality of first vehicles is connected to a second vehicle and a state in which the plurality of first vehicles is disconnected from the second vehicle.

The second vehicle 20 is a vehicle to which the plurality of first vehicles 10 is detachably connected. Here, the number of first vehicles 10 which are connected to the second vehicle 20 does not need to be two or more. The second vehicle 20 may be connected to one first vehicle 10 or may be connected to two or more first vehicles 10. The second vehicle 20 travels while towing one first vehicle 10 connected to the second vehicle 20 or two or more first vehicles 10 connected to the second vehicle 20. FIG. 2 is a diagram illustrating an example of a state in which a plurality of first vehicles 10 is connected to the second vehicle 20 and a state in which the plurality of first vehicles 10 is disconnected from the second vehicle 20. As illustrated in FIG. 2, each first vehicle 10 includes a connection unit 11. The second vehicle 20 includes a connection unit 21. The first vehicle 10 is connected to the second vehicle 20 by connecting the connection unit 11 of the first vehicle 10 to the connection unit 21 of the second vehicle 20. By connecting the connection units 11 of two first vehicles 10 to each other, the first vehicles 10 are connected to each other. Accordingly, a plurality of first vehicles 10 can be connected to the second vehicle 20. As illustrated in FIG. 2, the first vehicle 10 is disconnected from the second vehicle 20 by disconnecting the connection units 11 from each other or disconnecting the connection unit 11 and the connection unit 21 from each other.

The structures of the connection unit 11 and the connection unit 21 are not particularly limited as long as they can be connected and disconnected. For example, structures in which the connection unit 11 and the connection unit 21 are connected by a magnetic force between electromagnets can be employed as the structures of the connection units. In this case, by stopping supply of electric power to the connection unit 11 or the connection unit 21, the first vehicle 10 can be disconnected from the second vehicle 20. The second vehicle 20 may be a vehicle which is controlled by a driver. Alternatively, the second vehicle 20 may be a vehicle which has an autonomous travel function.

Each first vehicle 10 is a vehicle that can switch a travel function between an autonomous travel function and a following travel function. The first vehicle 10 travels by the autonomous travel function or the following travel function when it is disconnected from the second vehicle 20. Here, the autonomous travel function is a function of allowing the first vehicle 10 to travel autonomously without depending on a person's operation. The following travel function is a function of allowing the first vehicle 10 to automatically follow a preceding vehicle while keeping an inter-vehicle distance between the first vehicle 10 and the preceding vehicle constant.

In the control system 1, the travel control device 100 and the control device 200 can communicate directly with each other to perform vehicle-to-vehicle communication between the first vehicle 10 and the second vehicle 20. The control device 200 and the onboard device 300 can communicate directly with each other to perform vehicle-to-vehicle communication between the first vehicle 10 and the other vehicle 30.

The control device 200 which is mounted in the second vehicle 20 is a device that controls the second vehicle 20. The control device 200 is constituted by a computer including a processor 210, a main storage unit 220, an auxiliary storage unit 230, and a vehicle-to-vehicle communication interface (communication I/F) 240. The processor 210 is, for example, a central processing unit (CPU) or a digital signal processor (DSP). The main storage unit 220 is, for example, a random access memory (RAM). The auxiliary storage unit 230 is, for example, a read only memory (ROM). The auxiliary storage unit 230 is, for example, a hard disk drive (HDD) or a disc recording medium such as a CD-ROM, a DVD disc, or a Blu-ray disc. The auxiliary storage unit 230 may be a removable medium (a portable storage medium). Examples of the removable medium include a USB memory and an SD card. The vehicle-to-vehicle communication I/F 240 is an interface that performs vehicle-to-vehicle communication with a vehicle by communicating with the first vehicles 10 and radio communication devices of vehicles traveling near the second vehicle 20. The vehicle-to-vehicle communication I/F 240 is, for example, a radio communication circuit for radio communication.

In the control device 200, an operating system (OS), various programs, various types of information tables, and the like are stored in the auxiliary storage unit 230. In the control device 200, the processor 210 can realize various functions which will be described later by loading a program stored in the auxiliary storage unit 230 to the main storage unit 220 and executing the loaded program. Here, some or all functions of the control device 200 may be realized by a hardware circuit such as an ASIC or an FPGA. The control device 200 does not need to be realized by a single physical structure and may be constituted by a plurality of computers cooperating with each other. The control device 100 of each first vehicle 10 and the onboard device 300 of the other vehicle 30 are constituted by a computer similarly to the control device 200.

Disconnection of First Vehicle

Control when a first vehicle 10 is disconnected from the second vehicle 20 will be described below with reference to FIGS. 3 and 4. When a plurality of first vehicles 10 is connected to the second vehicle 20 and the other vehicle 30 which can serve as a preceding vehicle of one of the plurality of first vehicles 10 is located within a predetermined range from the second vehicle 20, the first vehicle 10 is disconnected from the second vehicle 20. Here, the other vehicle 30 which can serve as a preceding vehicle is a vehicle of which some or all of a scheduled travel route is the same as some or all of the scheduled travel route of the first vehicle 10 (a scheduled travel route after the first vehicle 10 has been disconnected from the second vehicle 20). The first vehicle 10 disconnected from the second vehicle 20 automatically follows the other vehicle 30 by the autonomous travel function.

Figure 3:
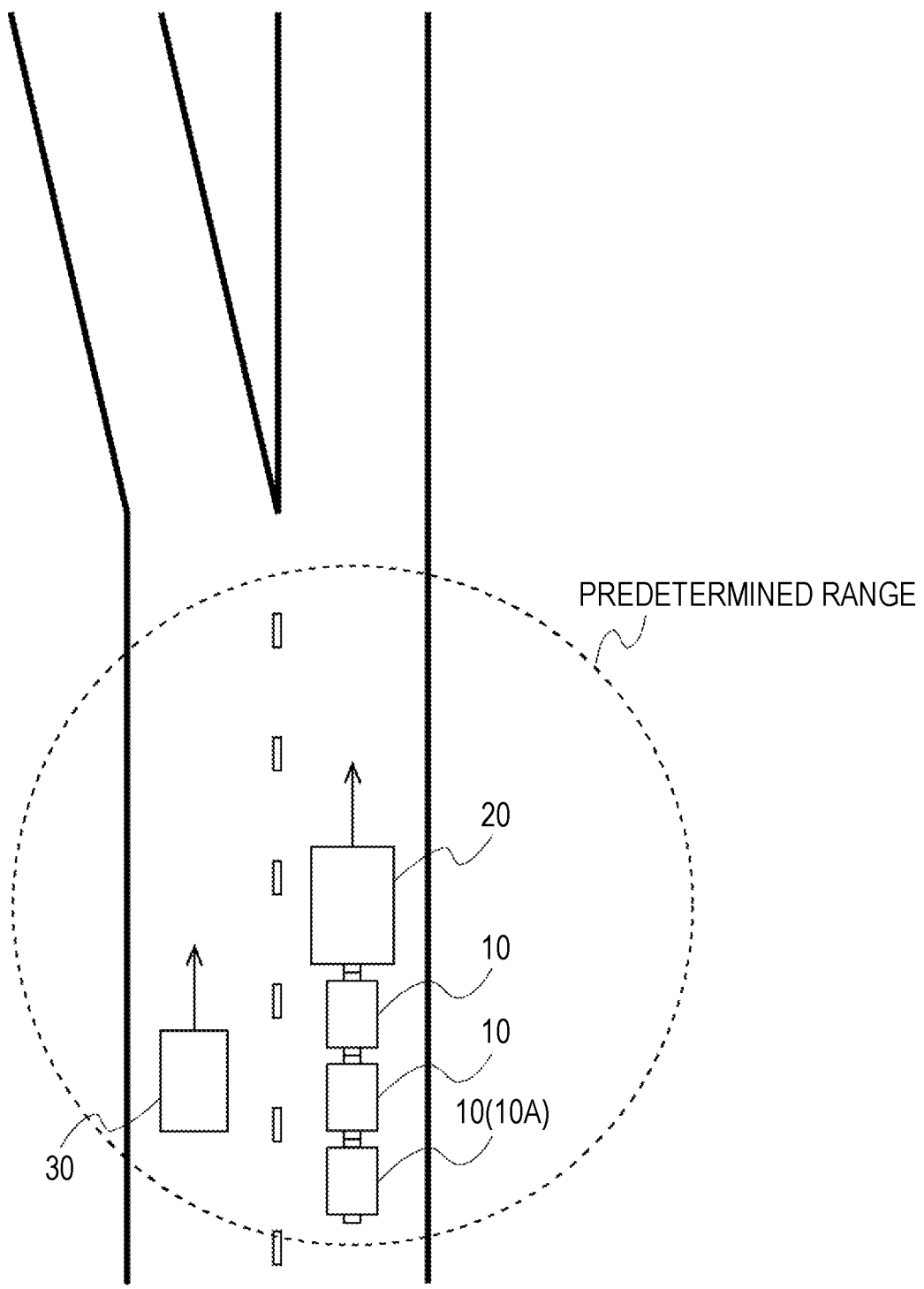
FIG. 3 is a diagram illustrating an example of a state in which a second vehicle, a plurality of first vehicles connected to the second vehicle, and another vehicle are traveling.
Figure 4:
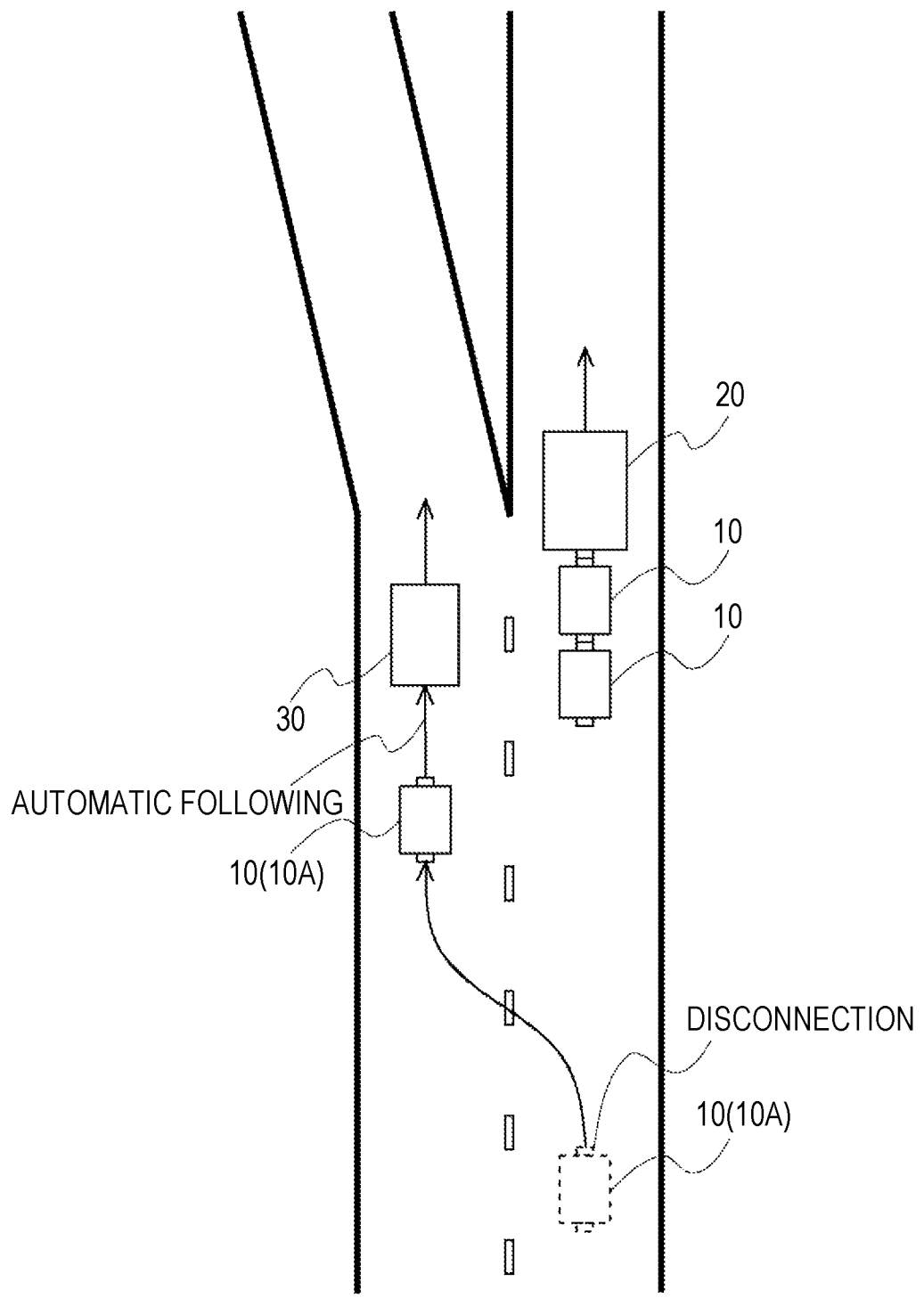
FIG. 4 is a diagram illustrating an example of a state in which a rearmost vehicle is disconnected from the second vehicle and travels while following another vehicle.

FIG. 3 is a diagram illustrating an example of a state in which the second vehicle 20, a plurality of first vehicles 10 connected to the second vehicle 20, and the other vehicle 30 are traveling. As illustrated in FIG. 3, the other vehicle 30 is located within a predetermined range from the second vehicle 20. In the example illustrated in FIG. 3, it is assumed that some or all of a scheduled travel route of the other vehicle 30 is the same as some or all of a scheduled travel route of a first vehicle 10 located on the rearmost side (hereinafter also referred to as a "rearmost vehicle 10A") out of the plurality of first vehicles 10 connected to the second vehicle 20. That is, it is assumed that the other vehicle 30 illustrated in FIG. 3 is a vehicle which can serve as a preceding vehicle of the rearmost vehicle 10A. The other vehicle 30 may be a vehicle which is controlled by a driver. Alternatively, the other vehicle 30 may be a vehicle having an autonomous travel function.

At this time, the rearmost vehicle 10A is disconnected from the second vehicle 20 and automatically follows the other vehicle 30 which serves as a preceding vehicle. FIG. 4 is a diagram illustrating an example of a state in which the rearmost vehicle 10A is disconnected from the second vehicle 20 and automatically follows the other vehicle 30. At this time, the rearmost vehicle 10A disconnected from the second vehicle 20 first travels to a position at which it can automatically follow the other vehicle 30 which is an automatic following target by the autonomous travel function. Thereafter, the rearmost vehicle 10A switches a travel function thereof to the following travel function and automatically follows the other vehicle 30 serving as a preceding vehicle. The second vehicle 20 travels along a schedule travel route of the second vehicle 20 in a state in which the first vehicles 10 other than the disconnected rearmost vehicle 10A are connected thereto.

System Configuration

Figure 5:
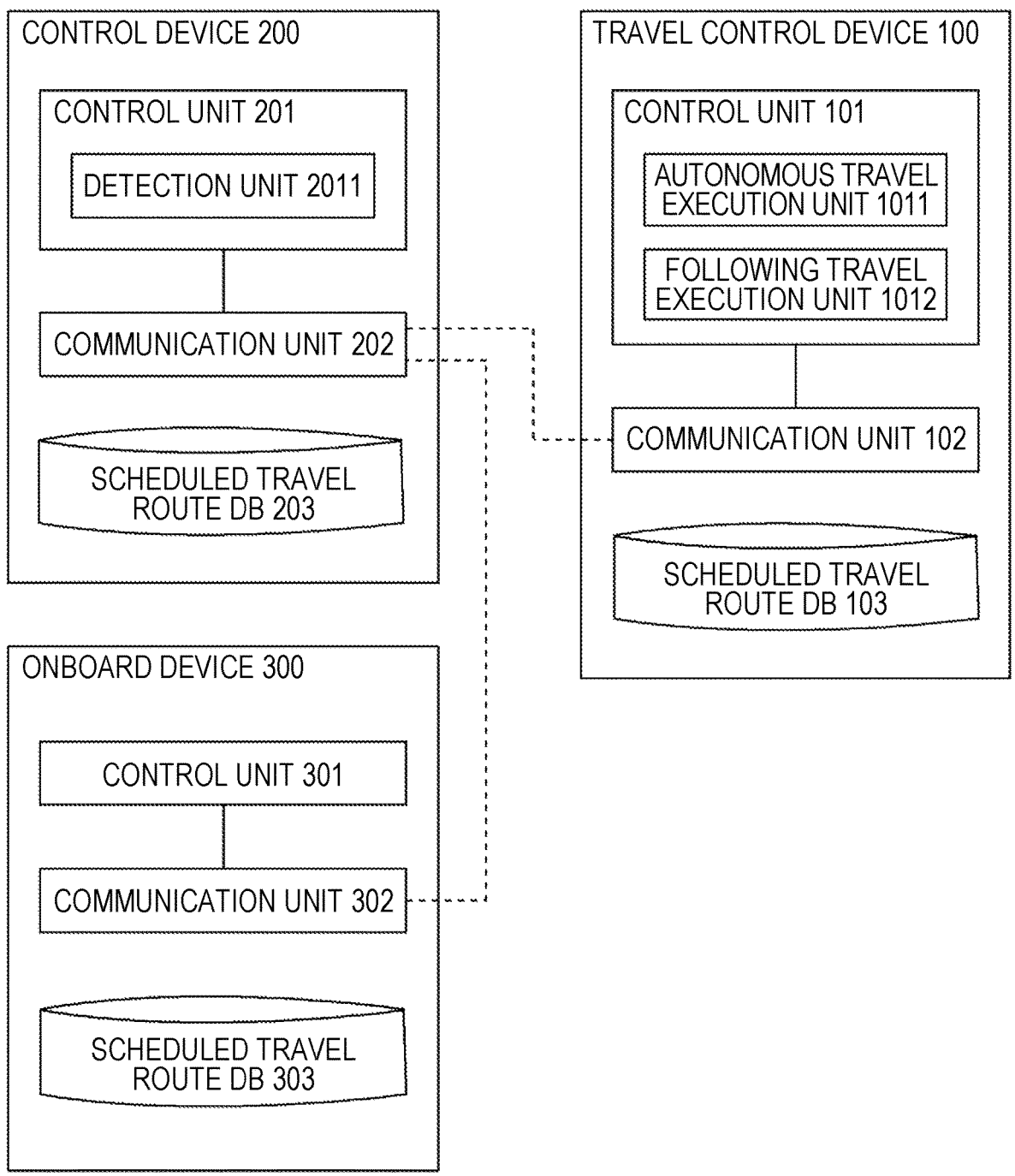
FIG. 5 is a block diagram schematically illustrating an example of functional configurations of a travel control device, a control device, and an onboard device constituting the control system according to the first embodiment.

The functional configurations of the travel control device 100, the control device 200, and the onboard device 300 constituting the control system 1 will be described below with reference to FIG. 5. FIG. 5 is a block diagram schematically illustrating an example of the functional configurations of the travel control device 100, the control device 200, and the onboard device 300 constituting the control system 1 according to this embodiment.

Onboard Device

The onboard device 300 mounted in the other vehicle 30 is a device that manages the scheduled travel route of the other vehicle 30. An example of the onboard device 300 is a car navigation system which is mounted in the other vehicle 30. The onboard device 300 includes a control unit 301, a communication unit 302, and a scheduled travel route database (scheduled travel route DB) 303. The control unit 301 has a function of performing an arithmetic operation process for controlling the onboard device 300. The control unit 301 can be realized by a processor of the onboard device 300.

The scheduled travel route DB 303 is a database that stores route information including the scheduled travel route of the other vehicle 30. The scheduled travel route DB 303 can be realized by an auxiliary storage unit of the onboard device 300.

The communication unit 302 has a function of performing vehicle-to-vehicle communication with the second vehicle 20 by communicating with the control device 200 mounted in the second vehicle 20. The communication unit 302 can be realized by a vehicle-to-vehicle communication I/F in the other vehicle 30. The control unit 301 transmits route information of the other vehicle 30 to the control device 200 via the communication unit 302.

Travel Control Device

The travel control device 100 mounted in each first vehicle 10 is a device that controls travel of the first vehicle 10. The travel control device 100 includes a control unit 101, a communication unit 102, and a scheduled travel route DB 103. The communication unit 102 has a function of performing vehicle-to-vehicle communication with the second vehicle 20 by communicating with the control device 200 mounted in the second vehicle 20. The communication unit 102 can be realized by a vehicle-to-vehicle communication I/F of the travel control device 100. The scheduled travel route DB 103 is a database that stores route information of the first vehicle 10. The scheduled travel route DB 103 can be realized by an auxiliary storage unit in the first vehicle 10. Route information including a scheduled travel route of the first vehicle 10 is stored in advance in the scheduled travel route DB 103.

The control unit 101 has a function of performing an arithmetic operation process for controlling the first vehicle 10. The control unit 101 can be realized by a processor in the first vehicle 10. The control unit 101 includes an autonomous travel execution unit 1011 and a following travel execution unit 1012 as functional modules. The autonomous travel execution unit 1011 performs a process of allowing the first vehicle 10 to travel autonomously. The first vehicle 10 can have the autonomous travel function by the autonomous travel execution unit 1011. The following travel execution unit 1012 performs a process of allowing the first vehicle 10 to automatically follow a preceding vehicle. The first vehicle 10 can have the following travel function by the following travel execution unit 1012. Known processes can be employed as the processes which are performed by the autonomous travel execution unit 1011 and the following travel execution unit 1012 to allow the first vehicle 10 to travel.

Control Device

The control device 200 mounted in the second vehicle 20 is a device that controls the second vehicle 20. The control device 200 includes a control unit 201, a communication unit 202, and a scheduled travel route DB 203. The communication unit 202 has a function of performing vehicle-to-vehicle communication with each first vehicle 10 by communicating with the travel control device 100 in the first vehicle 10. The communication unit 202 also has a function of performing vehicle-to-vehicle communication with the other vehicle 30 by communicating with the onboard device 300 in the other vehicle 30. The communication unit 202 can be realized by the vehicle-to-vehicle communication I/F 240.

The control unit 201 has a function of performing an arithmetic operation process for controlling the control device 200. The control unit 201 can be realized by the processor 210. The scheduled travel route DB 203 is a database that stores route information of the first vehicles 10 connected to the second vehicle 20 and route information of the other vehicle 30. The scheduled travel route DB 203 can be realized by the auxiliary storage unit 230. The route information of the first vehicles 10 connected to the second vehicle 20 is stored in the scheduled travel route DB 203 in advance. The control unit 201 receives route information of one or more other vehicles 30 located within a predetermined range from the second vehicle 20 from the onboard devices 300 via the communication unit 202. The control unit 201 stores the route information of the one or more other vehicles 30 received from the onboard devices 300 in the scheduled travel route DB 203. The route information of the first vehicles 10 may be received from the travel control devices 100 of the first vehicles 10 via the communication unit 202.

The control unit 201 includes a detection unit 2011 as a functional module. The detection unit 2011 detects another vehicle 30 of which some or all of a scheduled travel route is the same as some or all of a scheduled travel route of one of the plurality of first vehicles 10 based on the route information of the first vehicles 10 connected to the second vehicles 20 and the route information of the one or more other vehicles 30 which are stored in the scheduled travel route DB 203. More specifically, the detection unit 2011 determines whether some or all of the scheduled travel route of the one or more other vehicles 30 (that is, the other vehicles 30 located within a predetermined range from the second vehicle 20) stored in the scheduled travel route DB 203 is the same as some or all of the scheduled travel route of one of the plurality of first vehicles 10. In this way, the detection unit 2011 detects the other vehicle 30 which is located within a predetermined range from the second vehicle 20 and of which some or all of the scheduled travel route is the same as some or all of the scheduled travel route of one of the plurality of first vehicles 10.

Then, the control unit 201 transmits following instruction information for traveling by the following travel function with the other vehicle 30 detected by the detection unit 2011 (hereinafter also referred to as a "detected vehicle 30") as a preceding vehicle to the travel control device 100 of the first vehicle 10 of which some or all of the scheduled travel route is the same as some or all of the scheduled travel route of the detected vehicle 30 (hereinafter also referred to as a "specific first vehicle 10") via the communication unit 202. Here, the following instruction information includes information on the detected vehicle 30. The first vehicle 10 can travel with the detected vehicle 30 as a preceding vehicle by the following travel function based on the following instruction information. At this time, the control unit 201 disconnects the specific first vehicle 10 from the second vehicle 20. In this way, the specific first vehicle 10 disconnected from the second vehicle 20 automatically follows the detected vehicle 30 based on the following instruction information.

Following Instruction Process

Figure 6:
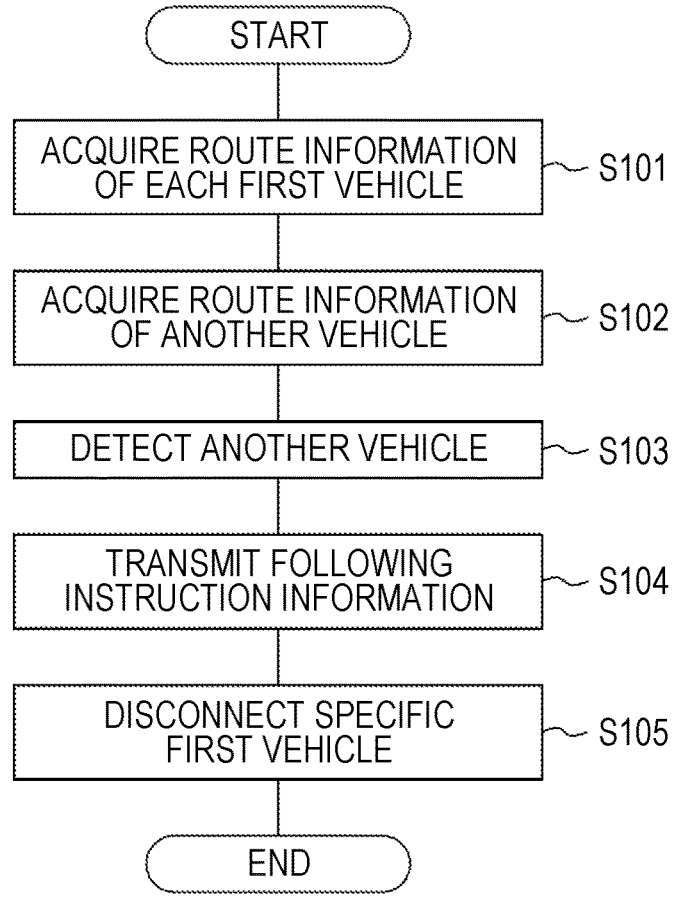
FIG. 6 is a flowchart illustrating a following instruction process according to the first embodiment.

A following instruction process that is performed by the control unit 201 of the control device 200 will be described below with reference to FIG. 6. FIG. 6 is a flowchart illustrating the following instruction process according to this embodiment. The following instruction process according to this embodiment is a process for causing the control device 200 to instruct the specific first vehicle 10 to travel with the detected vehicle 30 as a preceding vehicle by the following travel function. The following instruction process is performed when the second vehicle 20 is traveling while towing a plurality of first vehicles 10 or when the second vehicle 20 stops in a state in which a plurality of first vehicles 10 is connected thereto. That is, the following instruction process is performed when the second vehicle 20 is coupled to the first vehicles 10.

In the following instruction process, first, in S101, route information of the first vehicles 10 connected to the second vehicle 20, which is stored in the scheduled travel route DB 203, is acquired. Then, in S102, route information of the one or more other vehicles 30 stored in the scheduled travel route DB 203 is acquired. In S103, the other vehicle 30 (the detected vehicle 30) of which some or all of the scheduled travel route is the same as some or all of the scheduled travel route of one of the plurality of first vehicles 10 is detected based on the route information of the first vehicles 10 and the route information of the one or more other vehicles 30. Then, in S104, following instruction information is transmitted to the travel control device 100 of a specific first vehicle 10. Then, in S105, the specific first vehicle 10 is disconnected from the second vehicle 20. Further, in S103, the first vehicles 10 for which the other vehicle 30 of which some or all of the scheduled travel route is the same as that thereof has not been detected may be disconnected from the second vehicle 20 at a point at which the scheduled travel route thereof branches from the scheduled travel route of the second vehicle 20 and travel from that point by the autonomous travel function.

Following Process

Figure 7:
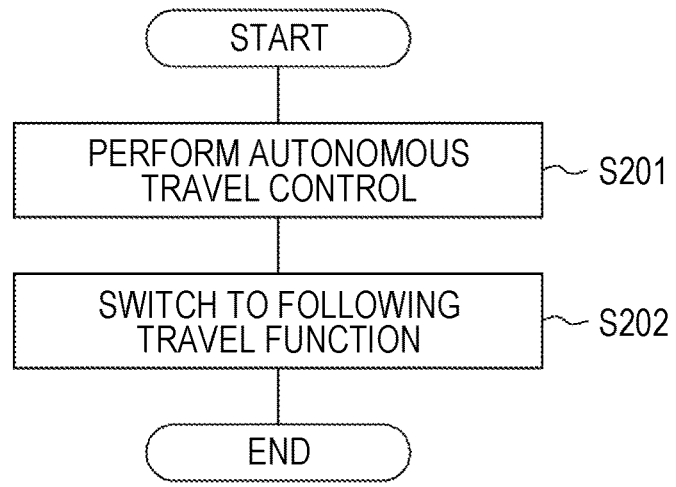
FIG. 7 is a flowchart illustrating a following process.

A following process which is performed by the control unit 101 of the travel control device 100 of the specific first vehicle 10 will be described below with reference to FIG. 7. FIG. 7 is a flowchart illustrating the following process. The following process is a process for causing the specific first vehicle 10 disconnected from the second vehicle 20 to automatically follow the detected vehicle 30. The following process is performed when the travel control device 100 of the specific first vehicle 10 receives the following instruction information and the specific first vehicle 10 is disconnected from the second vehicle 20.

In the following process, first, in S201, autonomous travel control for causing the first vehicle 10 disconnected from the second vehicle 20 to travel to a position at which it can automatically follow the detected vehicle 30 is performed based on the following instruction information. The autonomous travel control is performed by causing the autonomous travel execution unit 1011 of the control unit 101 to make the specific first vehicle 10 travel by the autonomous travel function based on the following instruction information. When the specific first vehicle 10 travels by the autonomous travel function to the position at which it can automatically follow the detected vehicle 30, the travel function of the specific first vehicle 10 is switched from the autonomous travel function to the following travel function in S202. That is, the travel control of the specific first vehicle 10 is switched from control under the autonomous travel execution unit 1011 to control under the following travel execution unit 1012. Thereafter, the specific first vehicle 10 automatically follows the detected vehicle 30 by the following travel function.

When a first vehicle 10 (the specific first vehicle 10) travels by the autonomous travel function, a larger amount of information needs to be processed than when the first vehicle 10 automatically follows a preceding vehicle. Accordingly, when the first vehicle 10 travels by the autonomous travel function, an operational load for realizing travel of the first vehicle 10 in the travel control device 100 becomes greater than when the first vehicle 10 automatically follows a preceding vehicle. Accordingly, by causing the specific first vehicle 10 to automatically follow the detected vehicle 30 as described above, it is possible to decrease the operational load for realizing travel of the specific first vehicle 10 in the travel control device 100.

Switching Process

A part of the scheduled travel route of the specific first vehicle 10 may be the same as some or all of the scheduled travel route of the detected vehicle 30 which the specific first vehicle 10 automatically follows as a preceding vehicle. In this case, the specific first vehicle 10 which automatically follows the detected vehicle 30 needs to travel on a travel route which is different from that of the detected vehicle 30 by the autonomous travel function. Therefore, when the specific first vehicle 10 reaches a point at which the scheduled travel route of the specific first vehicle 10 becomes different from the scheduled travel route of the detected vehicle 30 (hereinafter also referred to as a "branching point"), the switching process of switching the travel function of the specific first vehicle 10 from the following travel function to the autonomous travel function and causing the specific first vehicle 10 to travel autonomously along the scheduled travel route of the specific first vehicle 10 is performed.

The control unit 201 of the control device 200 generates branching information on the position of the branching point based on the route information of the detected vehicle 30 and the route information of the specific first vehicle 10. Then, in S104 of the following instruction process, the control unit 201 transmits following instruction information including the branching information to the travel control device 100 of the specific first vehicle 10. The travel control device 100 stores the branching information included in the received following instruction information in the scheduled travel route DB 103. Accordingly, the travel control device 100 can ascertain the branching point.

Figure 8:
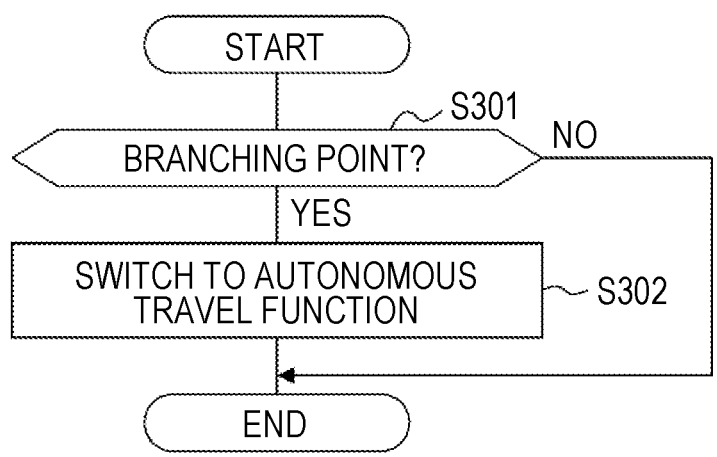
FIG. 8 is a flowchart illustrating a switching process.

A switching process which is performed by the control unit 101 of the travel control device 100 of the specific first vehicle 10 will be described below with reference to FIG. 8. FIG. 8 is a flowchart illustrating the switching process. The switching process is periodically performed when the specific first vehicle 10 is traveling by the following travel function with the detected vehicle 30 as a preceding vehicle.

In the switching process, first, in S301, it is determined whether the current location of the specific first vehicle 10 is the branching point based on the branching information stored in the scheduled travel route DB 103. When the determination result of S301 is negative, the specific first vehicle 10 does not reach the branching point and thus the switching process ends. That is, a state in which the specific first vehicle 10 is traveling by the following travel function with the detected vehicle 30 as a preceding vehicle is maintained. When the determination result of S301 is positive, the specific first vehicle 10 reaches the branching point, thus the travel function of the specific first vehicle 10 is switched from the following travel function to the autonomous travel function in S302, and the switching process ends. As a result, the specific first vehicle 10 starts travel by the autonomous travel function. Accordingly, the specific first vehicle 10 can travel to its destination.

As described above, a specific first vehicle 10 moves to the middle of a route to its destination in a state in which it is connected to or loaded on the second vehicle 20. When another vehicle 30 (a detected vehicle 30) which is located within a predetermined range from the second vehicle 20 and which can serve as a preceding vehicle is detected, the specific first vehicle 10 is disconnected from the second vehicle 20. Then, the specific first vehicle 10 automatically follows the detected vehicle 30. In this way, the specific first vehicle 10 can move to the middle of the route to its destination in a state in which it is connected to or loaded on the second vehicle 20, and move to its destination by automatically following a vehicle other than the second vehicle 20 from the middle of the route. As a result, the specific first vehicle 10 (the first vehicle 10) can move efficiently.

MODIFIED EXAMPLES

In this embodiment, the control device 200 mounted in the second vehicle 20 receives route information of other vehicles 30 which are located within a predetermined range from the second vehicle 20 from the onboard devices 300 of the other vehicles 30 by vehicle-to-vehicle communication. However, the control device 200 may receive the route information of the other vehicles 30 from a server device instead of the onboard devices 300. In this case, the server device receives the route information of the other vehicles 30 and current locations of the other vehicles 30 from the onboard devices 300. The server device receives a current location of the second vehicle 20 from the control device 200. Accordingly, the server device can ascertain the other vehicles 30 which are located within a predetermined range from the second vehicle 20 based on the current location of the second vehicle 20 and the current locations of the other vehicles 30. Therefore, when there is a request from the control device 200, the server device transmits the route information of the other vehicles 30 which are located within the predetermined range from the second vehicle 20 to the control device 200. The detection unit 2011 of the control device 200 detects the other vehicle 30 of which some or all of the scheduled travel route is the same as some or all of the scheduled travel route of one of the plurality of first vehicles 10 based on the route information of the other vehicles 30 received from the server device.

A plurality of other vehicles 30 of which some or all of the scheduled travel route is the same as some or all of the scheduled travel route of one of the plurality of first vehicles 10 may be located within a predetermined range from the second vehicle 20. At this time, the control device 200 receives route information of the plurality of other vehicles 30 which is located within the predetermined range from the second vehicles 20 from the onboard devices 300 of the other vehicles 30 by vehicle-to-vehicle communication. Then, the control device 200 may select the other vehicle 30 with a longer distance by which the scheduled travel route is the same as the scheduled travel route of the first vehicle 10 out of the plurality of other vehicles 30 as a preceding vehicle which the first vehicle 10 automatically follows. Accordingly, the first vehicle 10 can automatically follow the other vehicle 30 with a longer distance by which the scheduled travel route is the same as the scheduled travel route of the first vehicle 10 out of the plurality of other vehicles 30.

Figure 9:
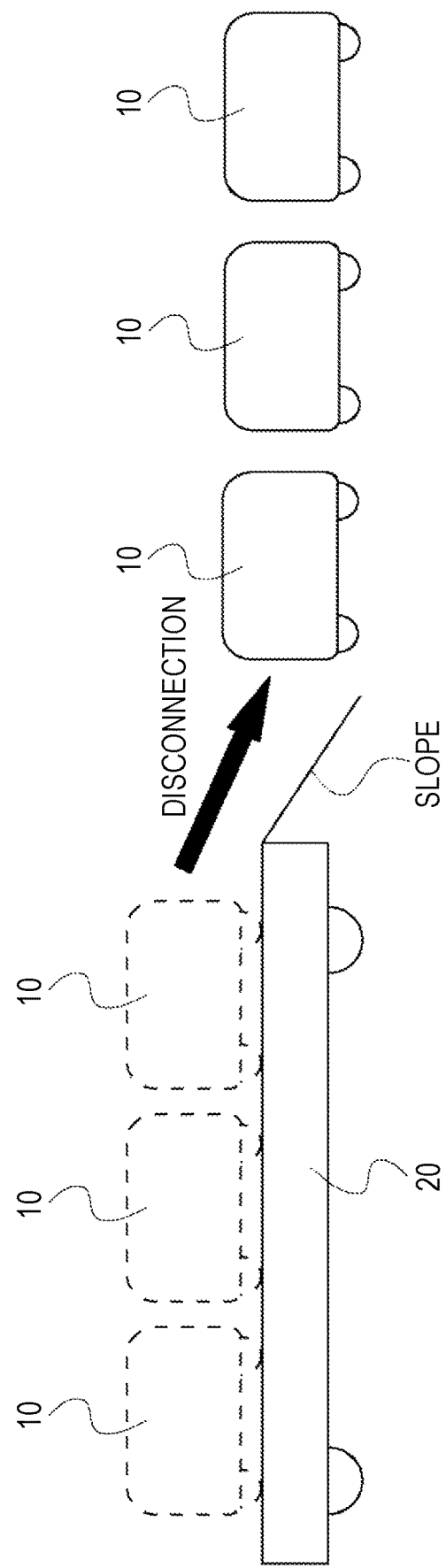
FIG. 9 is a diagram illustrating an example of a state in which a first vehicle is loaded on a second vehicle and a state in which the first vehicle is disconnected from the second vehicle.

The connection form between the second vehicle 20 and the first vehicles 10 is not limited to the form illustrated in FIG. 2. FIG. 9 is a diagram illustrating an example of a state in which first vehicles 10 are loaded on the second vehicle 20 and a state in which the first vehicles 10 are disconnected from the second vehicle 20. In the example illustrated in FIG. 9, the second vehicle 20 travels in a state in which a plurality of first vehicles 10 is loaded thereon. Each first vehicle 10 is disconnected from the second vehicle 20 using a slope which is provided in the second vehicle 20.

Second Embodiment

In a second embodiment, another vehicle 30 (a detected vehicle 30) which is located within a predetermined range from a second vehicle 20 and of which some or all of a scheduled travel route is the same as some or all of a scheduled travel route of one of a plurality of first vehicles 10 is detected by a management server. Then, the management server transmits instruction information for causing a first vehicle 10 to travel by a following travel function with the detected vehicle 30 as a preceding vehicle to the control device 200 mounted in the second vehicle 20. Hereinafter, differences from the first embodiment will be described.

Configuration of System

Figure 10:
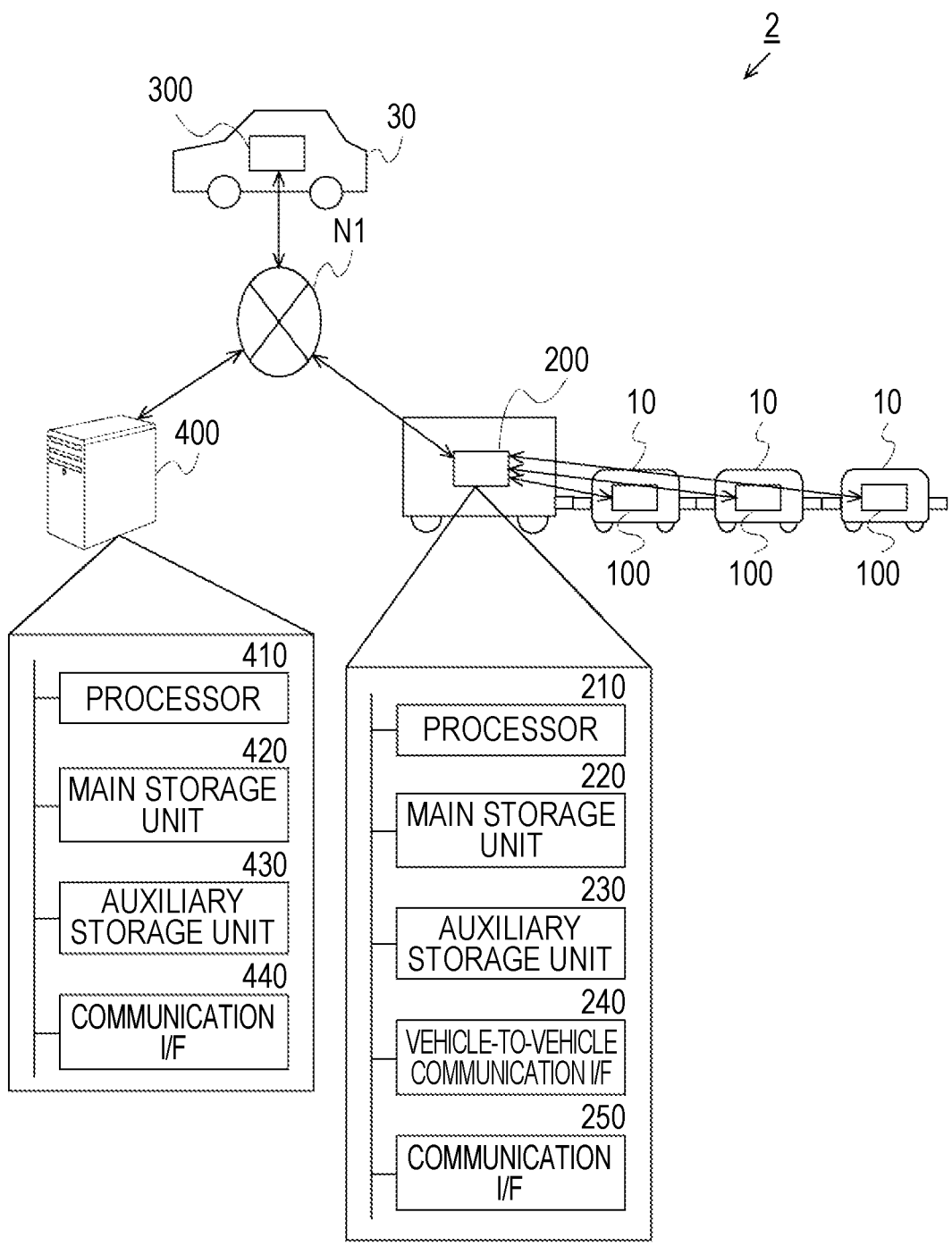
FIG. 10 is a diagram schematically illustrating a configuration of a control system according to a second embodiment.

A control system 2 according to this embodiment will be described below with reference to FIG. 10. FIG. 10 is a diagram schematically illustrating a configuration of the control system 2 according to this embodiment. The control system 2 includes a travel control device 100, a control device 200, an onboard device 300, and a management server 400. In the control system 2, the control device 200, the onboard device 300, and the management server 400 are connected to each other via a network N1. For example, a wide area network (WAN) which is a global public communication network such as the Internet or a telephone communication network of mobile phones and the like may be employed as the network N1. The travel control device 100 and the control device 200 can communicate directly with each other to perform vehicle-to-vehicle communication between a first vehicle 10 and the second vehicle 20. The management server 400 in this embodiment corresponds to an "information processing device" according to a second aspect of disclosure.

In this embodiment, the control device 200 further includes a communication I/F 250. The communication I/F 250 is an interface that connects the control device 200 to the network N1. The communication I/F 250 is, for example, a communication circuit for radio communication. The travel control device 100 and the onboard device 300 are each constituted by a computer similarly to the control device 200.

The management server 400 is a server that manages current locations and scheduled travel routes of a plurality of vehicles including the second vehicle 20 and other vehicles 30. A processor 410, a main storage unit 420, and an auxiliary storage unit 430 in the management server 400 are the same as the processor 210, the main storage unit 220, and the auxiliary storage unit 230 in the control device 200. A communication I/F 440 in the management server 400 is an interface for connecting the management server 400 to the network N1. The communication I/F 440 is, for example, a local area network (LAN) interface board or a radio communication circuit for radio communication.

System Configuration

Figure 11:
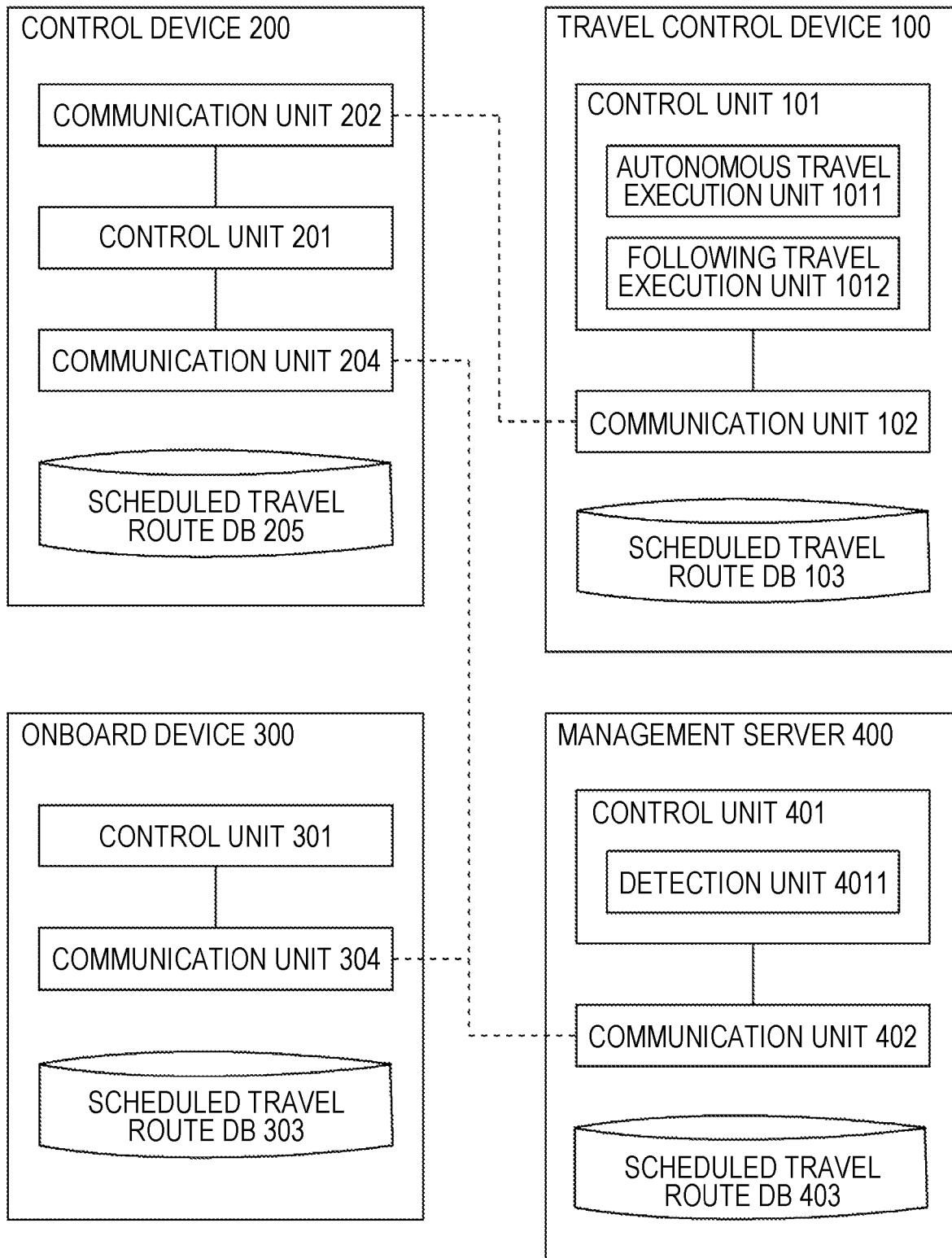
FIG. 11 is a block diagram schematically illustrating an example of functional configurations of a travel control device, a control device, an onboard device, and a management server constituting the control system according to the second embodiment.

Functional configurations of the travel control device 100, the control device 200, the onboard device 300, and the management server 400 constituting the control system 2 will be described below with reference to FIG. 11. FIG. 11 is a block diagram schematically illustrating an example of the functional configurations of the travel control device 100, the control device 200, the onboard device 300, and the management server 400 constituting the control system 2 according to this embodiment.

Onboard Device

In this embodiment, the onboard device 300 mounted in the other vehicle 30 includes a communication unit 304 instead of the communication unit 302 in the first embodiment. The communication unit 304 has a function of connecting the onboard device 300 to the network N1. The communication unit 304 can be realized by a communication I/F in the onboard device 300. The control unit 301 transmits route information of the other vehicle 30 stored in a scheduled travel route DB 303 along with a current location of the other vehicle 30 to the management server 400 via the communication unit 304.

Control Device

In this embodiment, the control device 200 mounted in the second vehicle 20 further includes a communication unit 204. The communication unit 204 has a function of connecting the control device 200 to the network N1. The communication unit 204 can be realized by a communication I/F 250. The control unit 201 transmits route information of first vehicles 10 stored in a scheduled travel route DB 205 along with the current location of the second vehicle 20 to the management server 400 via the communication unit 204.

Management Server

The management server 400 includes a control unit 401, a communication unit 402, and a scheduled travel route DB 403. The communication unit 402 has a function of connecting the management server 400 to the network N1. The communication unit 402 can be realized by a communication I/F 440.

The scheduled travel route DB 403 is a database that stores the current location of the second vehicle 20, route information of the first vehicles 10 connected to the second vehicle 20, and a current location and route information of another vehicle 30.

The scheduled travel route DB 403 can be realized by an auxiliary storage unit 430. The control unit 401 receives the route information of the first vehicles 10 connected to the second vehicle 20 along with the current location of the second vehicle 20 from the control device 200 via the communication unit 402. The control unit 401 stores the current location of the second vehicle 20 and the route information of the first vehicles 10 in the scheduled travel route DB 403. The control unit 401 receives the current location and the route information of another vehicle 30 from the onboard device 300 via the communication unit 402. The control unit 401 stores the current location and the route information of another vehicle 30 in the scheduled travel route DB 403.

The control unit 401 includes a detection unit 4011 as a functional module. The detection unit 4011 acquires route information of one or more other vehicles 30 which are located within a predetermined range from the second vehicle 20 based on the current location of the second vehicle 20 and the current locations of the other vehicles 30 stored in the scheduled travel route DB 403. Then, the detection unit 4011 detects another vehicle 30 (a detected vehicle 30) of which some or all of a scheduled travel route is the same as some or all of a scheduled travel route of one of the plurality of first vehicles 10 based on the route information of the first vehicles 10 stored in the scheduled travel route DB 403 and the acquired route information of one or more other vehicles 30 which are located within a predetermined range from the second vehicle 20. At this time, the detection unit 4011 detects the other vehicle 30 of which some or all of the scheduled travel route is the same as some or all of the scheduled travel route of one of the plurality of first vehicles 10 using the same method as in the detection unit 2011 of the control device 200 according to the first embodiment. In this way, the detection unit 4011 detects the other vehicle 30 which is located within a predetermined range from the second vehicle 20 and of which some or all of the scheduled travel route is the same as some or all of the scheduled travel route of one of the plurality of first vehicles 10. Then, the control unit 401 transmits instruction information to the control device 200 via the communication unit 402.

Instruction Process

Figure 12:
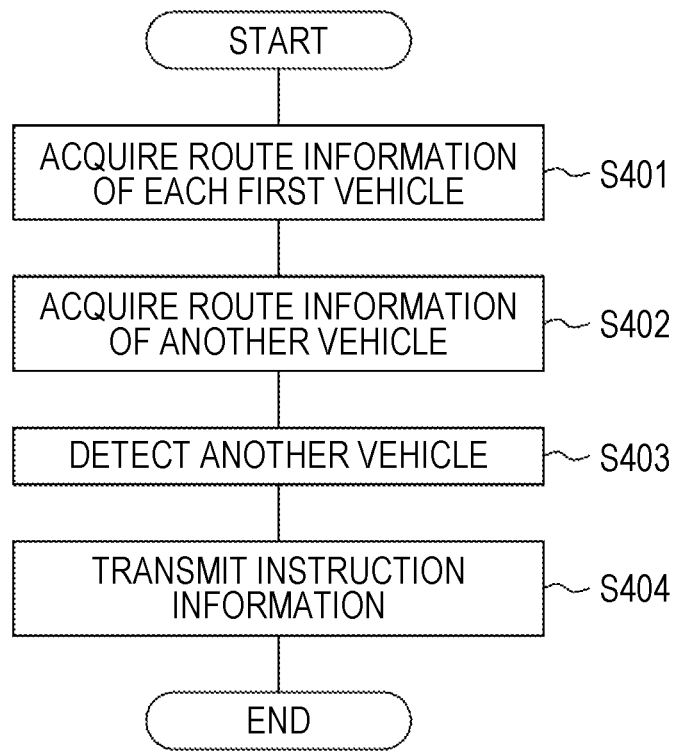
FIG. 12 is a flowchart illustrating an instruction process.

An instruction process which is performed by the control unit 401 of the management server 400 will be described below with reference to FIG. 12. FIG. 12 is a flowchart illustrating an instruction process. The instruction process is a process of transmitting instruction information to the control device 200. Similarly to the first embodiment, the instruction process is performed when the second vehicle 20 is traveling while towing a plurality of first vehicles 10 or when the second vehicle 20 stops in a state in which the plurality of first vehicles 10 is connected thereto. Information indicating that the second vehicle 20 is traveling while towing a plurality of first vehicles 10 or that the second vehicle 20 stops in a state in which the plurality of first vehicles 10 is connected thereto may be transmitted from the control device 200 of the second vehicle 20 to the management server 400.

In the instruction process, first, in S401, the route information of the first vehicles 10 stored in the scheduled travel route DB 403 is acquired. Then, in S402, route information of one or more other vehicles 30 which are located within a predetermined range from the second vehicle 20 is acquired from the scheduled travel route DB 403 based on the current locations of the second vehicle 20 and the other vehicles 30 stored in the scheduled travel route DB 403. Then, in S403, another vehicle 30 (a detected vehicle 30) of which some or all of a scheduled travel route is the same as some or all of the scheduled travel route of one of the first vehicles 10 is detected based on the acquired route information of the first vehicles 10 and the acquired route information of the other vehicles 30. In S404, instruction information is transmitted to the control device 200 of the second vehicle 20 such that the first vehicle travels by the following travel function with the detected vehicle 30 as a preceding vehicle.

Following Instruction Process

Figure 13:
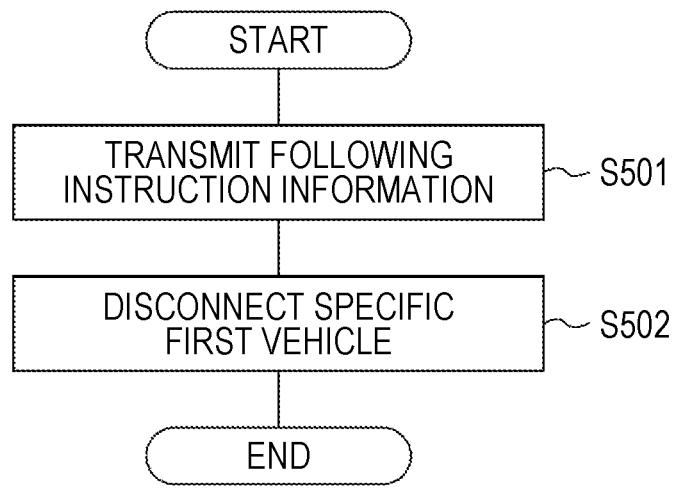
FIG. 13 is a flowchart illustrating a following instruction process according to the second embodiment.

When the instruction information is received from the management server 400 via the communication unit 204, the control unit 201 of the control device 200 mounted in the second vehicle 20 performs a following instruction process. FIG. 13 is a flowchart illustrating a following instruction process according to this embodiment. The following instruction process in this embodiment is a process of causing the control device 200 to instruct the first vehicle 10 to travel by the following travel function with the detected vehicle 30 as a preceding vehicle. The following instruction process is started when the control device 200 mounted in the second vehicle 20 receives the instruction information.

In the following instruction process, first, in S501, following instruction information for causing a specific first vehicle 10 to follow the detected vehicle 30 as a preceding vehicle is transmitted to the travel control device 100 of the specific first vehicle 10 based on the instruction information. Then, in S502, the specific first vehicle 10 is disconnected from the second vehicle 20 and the following instruction process ends. The travel control device 100 of the first vehicle 10 having received the following instruction information performs the following process similarly to the first embodiment.

As described above, with the control system 2 according to this embodiment, a first vehicle 10 can move efficiently.

MODIFIED EXAMPLES

Similarly to the control device 200 according to the modified example of the first embodiment, when a plurality of other vehicles 30 of which some or all of a scheduled travel route is the same as some or all of the scheduled travel route of one of a plurality of first vehicles 10 is located within a predetermined range from the second vehicle 20, the management server 400 may select the other vehicle 30 with a longer distance by which the scheduled travel route is the same as the scheduled travel route of the first vehicle 10 out of the plurality of other vehicles 30 as a preceding vehicle which is automatically followed.

The management server 400 transmits instruction information including branching information to the control device 200. Then, the control device 200 transmits following instruction information including the branching information to the travel control device 100 of the specific first vehicle 10 based on the instruction information. Accordingly, the travel control device 100 of the specific first vehicle 10 can ascertain the position of a branching point. Accordingly, when the specific first vehicle 10 reaches the branching point, the travel control device 100 of the specific first vehicle 10 which automatically follows the detected vehicle 30 can switch the travel function of the specific first vehicle 10 from the following travel function to the autonomous travel function. As a result, the specific first vehicle 10 can travel autonomously along the scheduled travel route of the specific first vehicle 10.

OTHER EMBODIMENTS

The aforementioned embodiments are merely an example and the disclosure can be appropriately modified without departing from the gist thereof. The processes or units which have been described above in the disclosure can be freely combined unless technical conflictions arise.

A process which has been described to be performed by a single device may be distributed to and performed by a plurality of devices. Alternatively, processes which have been described to be performed by different devices may be performed by a single device. In a computer system, by what hardware configuration (server configuration) each function is to be realized can be flexibly changed.

The disclosure can also be embodied by supplying a computer program having the functions described above in the aforementioned embodiment to a computer and causing one or more processors of the computer to read and execute the computer program. Such a computer program may be provided to the computer via a non-transitory computer-readable storage medium which can access a system bus of the computer or may be provided to the computer via a network. Examples of the non-transitory computer-readable storage medium include an arbitrary type of disk such as a magnetic disk (such as a Floppy (registered trademark) disk or a hard disk drive (HDD)) or an optical disc (such as a CD-ROM, a DVD disc, or a blue-ray disc), and an arbitrary type of medium which is suitable for storing electronic commands such as a read only memory (ROM), a random access memory (RAM), an EPROM, an EEPROM, a magnetic card, a flash memory, an optical card.

What is claimed is:

1. A control device that is mounted in a second vehicle which a plurality of first vehicles each having a following travel function are detachably connected to or loaded on, the control device comprising a processor configured to execute a program stored in a memory so as to perform:
   detecting another vehicle that is within a predetermined range from the second vehicle in a state in which the second vehicle has the plurality of first vehicles connected thereto or loaded thereon;
   comparing a scheduled travel route of the other vehicle to a scheduled travel route of each of the plurality of first vehicles once disconnected from the second vehicle;
   transmitting following instruction information to a specific first vehicle of the plurality of first vehicles whose scheduled travel route is the same as some or all of the scheduled travel route of the other vehicle;
   after the comparing and the transmitting, disconnecting the specific first vehicle from the second vehicle such that the specific first vehicle travels with the detected other vehicle as a preceding vehicle by the following travel function; and
   disconnecting from the second vehicle other first vehicles of the plurality of first vehicles, the other first vehicles being vehicles for which no other vehicle that has a scheduled travel route that is the same as some or all of the scheduled travel routes of the other first vehicles was detected, and the other first vehicles being disconnected from the second vehicle at points at which the scheduled travel routes of the other first vehicles branch from the scheduled travel route of the second vehicle so that the disconnected other first vehicles travel from those points by an autonomous travel function of each other first vehicle,
   wherein the specific first vehicle is disconnected from the second vehicle by way of a slope that is provided in the second vehicle.

2. The control device according to claim 1, wherein, when there is within the predetermined range from the second vehicle a plurality of the other vehicles of which some or all of a scheduled travel route is the same as some or all of the scheduled travel route of the specific first vehicle, the processor is configured to further perform selecting one of the other vehicles in which a distance for which the scheduled travel route is the same as the scheduled travel route of the specific first vehicle is longest out of the plurality of other vehicles as the preceding vehicle which is automatically followed by the specific first vehicle.

3. The control device according to claim 1, wherein each of the plurality of first vehicles further has the autonomous travel function, and
   wherein the specific first vehicle travels to a position at which the specific first vehicle automatically follows the detected other vehicle by the autonomous travel function based on the following instruction information when the specific first vehicle is disconnected from the second vehicle, and the specific first vehicle then switches a travel function of the specific first vehicle from the autonomous travel function to the following travel function.

4. The control device according to claim 1,
   wherein each of the plurality of first vehicles further has the autonomous travel function,
   wherein the following instruction information which is transmitted from the processor to the specific first vehicle includes branching information of a branching point from which the scheduled travel route of the specific first vehicle becomes different from the scheduled travel route of the other vehicle, and
   wherein the specific first vehicle switches a travel function of the specific first vehicle from the following travel function to the autonomous travel function when the specific first vehicle reaches the branching point based on the branching information.

5. The control device according to claim 1, further comprising a database configured to store route information of the plurality of first vehicles, which includes the scheduled travel routes of the plurality of first vehicles, and route information of the other vehicle, which includes the scheduled travel route of the other vehicle,
   wherein the processor is configured to detect the other vehicle based on the route information of the plurality of first vehicles and the route information of the other vehicle stored in the database.

6. The control device according to claim 5, wherein the processor is configured to further perform:
   receiving the route information of the other vehicle from the other vehicle by vehicle-to-vehicle communication; and
   storing the received route information of the other vehicle in the database.

7. The control device according to claim 5, wherein the processor is configured to further perform:
   receiving the route information of the other vehicle from a server device that manages the scheduled travel route and a current location of the other vehicle; and
   storing the received route information of the other vehicle in the database.

8. An information processing device that manages a second vehicle which a plurality of first vehicles each having a following travel function are detachably connected to or loaded on, the information processing device comprising a processor configured to execute a program stored in a memory so as to perform:
   detecting another vehicle that is within a predetermined range from the second vehicle in a state in which the second vehicle has the plurality of first vehicles connected thereto or loaded thereon;
   comparing a scheduled travel route of the other vehicle to a scheduled travel route of each of the plurality of first vehicles once disconnected from the second vehicle;
   transmitting instruction information to the second vehicle such that, after the comparing and the transmitting, a specific first vehicle of the plurality of first vehicles whose scheduled travel route is the same as some or all of the scheduled travel route of the other vehicle travels with the detected other vehicle as a preceding vehicle by the following travel function,
   wherein the specific first vehicle is disconnected from the second vehicle by way of a slope that is provided in the second vehicle, and
   wherein other first vehicles of the plurality of first vehicles, the other first vehicles being vehicles for which no other vehicle that has a scheduled travel route that is the same as some or all of the scheduled travel routes of the other first vehicles was detected, are disconnected from the second vehicle at points at which the scheduled travel routes of the other first vehicles branch from the scheduled travel route of the second vehicle so that the disconnected other first vehicles travel from those points by an autonomous travel function of each other first vehicle.

9. The information processing device according to claim 8, wherein, when there is within the predetermined range from the second vehicle a plurality of the other vehicles of which some or all of a scheduled travel route is the same as some or all of the scheduled travel route of the specific first vehicle, the processor is configured to further perform selecting one of the other vehicles in which a distance for which the scheduled travel route is the same as the scheduled travel route of the specific first vehicle is longest out of the plurality of other vehicles as the preceding vehicle which is automatically followed by the specific first vehicle.

10. The information processing device according to claim 8, further comprising a database configured to store route information of the plurality of first vehicles, which includes the scheduled travel routes of the plurality of first vehicles, and route information of the other vehicle, which includes the scheduled travel route of the other vehicle, and
   wherein the processor is configured to detect the other vehicle based on the route information of the plurality of first vehicles and the route information of the other vehicle stored in the database.

11. The information processing device according to claim 10, wherein the processor is configured to further perform:
   receiving the route information of each of the plurality of first vehicles from the second vehicle;
   receiving the route information of the other vehicle from the other vehicle; and
   storing the received route information of the plurality of first vehicles and the received route information of the other vehicle in the database.

12. The information processing device according to claim 8, wherein the second vehicle transmits following instruction information to the specific first vehicle and disconnects the specific first vehicle from the second vehicle such that the specific first vehicle travels with the detected other vehicle as the preceding vehicle by the following travel function based on the instruction information.

13. The information processing device according to claim 12, wherein each of the plurality of first vehicles further has the autonomous travel function, and
   wherein the specific first vehicle travels to a position at which the specific first vehicle automatically follows the detected other vehicle by the autonomous travel function based on the following instruction information when the specific first vehicle is disconnected from the second vehicle, and the specific first vehicle then switches a travel function of the specific first vehicle from the autonomous travel function to the following travel function.

14. The information processing device according to claim 12,
   wherein each of the plurality of first vehicles further has the autonomous travel function,
   wherein the following instruction information which is transmitted from the second vehicle to the specific first vehicle includes branching information of a branching point from which the scheduled travel route of the specific first vehicle becomes different from the scheduled travel route of the other vehicle, and
   wherein the specific first vehicle switches a travel function of the specific first vehicle from the following travel function to the autonomous travel function when the specific first vehicle reaches the branching point based on the branching information included in the following instruction information.

15. An information processing method which is performed by a computer of a system including a control device that controls a second vehicle which a plurality of first vehicles each having a following travel function are detachably connected to or loaded on, the information processing method comprising:
   detecting another vehicle that is within a predetermined range from the second vehicle in a state in which the second vehicle has the plurality of first vehicles connected thereto or loaded thereon;
   comparing a scheduled travel route of the other vehicle to a scheduled travel route of each of the plurality of first vehicles once disconnected from the second vehicle;
   transmitting following instruction information from the control device to a specific first vehicle of the plurality of first vehicles whose scheduled travel route is the same as some or all of the scheduled travel route of the other vehicle;
   after the comparing and the transmitting, causing the control device to disconnect the specific first vehicle from the second vehicle such that the specific first vehicle travels with the detected other vehicle as a preceding vehicle by the following travel function; and
   causing the control device to disconnect from the second vehicle other first vehicles of the plurality of first vehicles, the other first vehicles being vehicles for which no other vehicle that has a scheduled travel route that is the same as some or all of the scheduled travel routes of the other first vehicles was detected, and the other first vehicles being disconnected from the second vehicle at points at which the scheduled travel routes of the other first vehicles branch from the scheduled travel route of the second vehicle so that the disconnected other first vehicles travel from those points by an autonomous travel function of each other first vehicle, wherein the specific first vehicle is disconnected from the second vehicle by way of a slope that is provided in the second vehicle.

16. The information processing method according to claim 15, wherein the system further includes an information processing device (i) comprising a processor configured to execute a program stored in a memory and (ii) configured to detect the other vehicle, wherein the information processing method further comprises transmitting instruction information from the information processing device to the second vehicle such that the specific first vehicle travels with the detected other vehicle as the preceding vehicle by the following travel function, and wherein the following instruction information is transmitted from the control device to the specific first vehicle based on the instruction information.

17. The information processing method according to claim 15, further comprising, when there is within the predetermined range from the second vehicle a plurality of the other vehicles of which some or all of a scheduled travel route is the same as some or all of the scheduled travel route of the specific first vehicle, selecting one of the other vehicles in which a distance for which the scheduled travel route is the same as the scheduled travel route of the specific first vehicle is longest out of the plurality of other vehicles as the preceding vehicle which is automatically followed by the specific first vehicle.

18. The information processing method according to claim 15, wherein each of the plurality of first vehicles further has the autonomous travel function, and wherein the specific first vehicle travels to a position at which the specific first vehicle automatically follows the detected other vehicle as the preceding vehicle by the autonomous travel function based on the following instruction information when the specific first vehicle is disconnected from the second vehicle, and the specific first vehicle then switches a travel function of the specific first vehicle from the autonomous travel function to the following travel function.

19. The information processing method according to claim 15, wherein each of the plurality of first vehicles further has the autonomous travel function, wherein the following instruction information includes branching information of a branching point from which the scheduled travel route of the specific first vehicle becomes different from the scheduled travel route of the other vehicle, and wherein the specific first vehicle switches a travel function of the specific first vehicle from the following travel function to the autonomous travel function when the specific first vehicle reaches the branching point based on the branching information.

20. The information processing method according to claim 15, wherein the system further includes a database configured to store route information of the plurality of first vehicles, which includes the scheduled travel routes of the plurality of first vehicles, and route information of the other vehicle, which includes the scheduled travel route of the other vehicle, and wherein the system detects the other vehicle based on the route information of the plurality of first vehicles and the route information of the other vehicle stored in the database.

* * * * *